# United States Patent
Wirola et al.

(10) Patent No.: US 9,519,042 B2
(45) Date of Patent: Dec. 13, 2016

(54) PERIODIC ASSISTANCE DATA FLOW CONTROL

(75) Inventors: Lauri Wirola, Tampere (FI); Ismo Halivaara, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 331 days.

(21) Appl. No.: 13/640,196

(22) PCT Filed: Apr. 11, 2011

(86) PCT No.: PCT/FI2011/050308
§ 371 (c)(1),
(2), (4) Date: May 24, 2013

(87) PCT Pub. No.: WO2011/128504
PCT Pub. Date: Oct. 20, 2011

(65) Prior Publication Data
US 2014/0113608 A1 Apr. 24, 2014

Related U.S. Application Data

(60) Provisional application No. 61/323,298, filed on Apr. 12, 2010.

(51) Int. Cl.
*G01S 5/00* (2006.01)
*H04W 28/02* (2009.01)
*G01S 19/04* (2010.01)

(52) U.S. Cl.
CPC .............. *G01S 5/0045* (2013.01); *G01S 19/04* (2013.01); *H04W 28/0231* (2013.01)

(58) Field of Classification Search
CPC .... G01S 5/0045; G01S 19/04; H04W 28/0231

USPC ...................................... 455/418, 456.1–457
See application file for complete search history.

(56) References Cited

U.S. PATENT DOCUMENTS

| 6,512,928 B1 | 1/2003 | Janky et al. |
| 2009/0109090 A1 | 4/2009 | Vollath |
| 2009/0135057 A1 | 5/2009 | Vollath et al. |
| 2009/0262016 A1 | 10/2009 | Wirola et al. |

(Continued)

FOREIGN PATENT DOCUMENTS

| CN | 101680939 | 3/2010 |
| EP | 1 857 830 A2 | 11/2007 |

(Continued)

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 9)", 3GPP TS 36.355, v9.0.0, Dec. 2009, pp. 1-102.*

(Continued)

*Primary Examiner* — Marcos Torres
(74) *Attorney, Agent, or Firm* — Alston & Bird LLP

(57) ABSTRACT

An apparatus and method are provided for handling a periodic assistance session flow. Each periodic assistance data provision includes a session identification so that interlinked messages within the periodic assistance data delivery can be linked in the receiving end. Any modifications to the session are handled via the periodic session identification so that the changes to the assistance data delivery can be pointed to the right session.

24 Claims, 9 Drawing Sheets

(56) References Cited

U.S. PATENT DOCUMENTS

2011/0039576 A1* 2/2011 Prakash et al. ............ 455/456.1

FOREIGN PATENT DOCUMENTS

| RU | 2263412 C2 | 10/2005 |
|---|---|---|
| WO | 2006/043123 A1 | 4/2006 |
| WO | 2008113698 | 9/2008 |
| WO | 2008142485 | 11/2008 |
| WO | 2009/056363 A1 | 5/2009 |
| WO | 2009129844 | 10/2009 |

OTHER PUBLICATIONS

U.S. Appl. No. 61/233,415 with priority to Aug. 12, 2009. Prakash et al.*

Office Action received for corresponding Russian Application No. 2012146409, dated Sep. 4, 2013, 15 pages.

Wirola, "Location Technology Standards Evolution in Wireless Networks", Dissertation, Mar. 12, 2010, 255 pages.

"3rd Generation Partnership Project; Technical Specification Group Radio Access Network; Evolved Universal Terrestrial Radio Access Network (E-UTRAN); Stage 2 functional Specification of User Equipment (UE) Positioning in E-UTRAN (Release 9)", 3GPP TS 36.305, v9.2.0, Mar. 2010, pp. 1-52.

Office Action for corresponding Chinese Patent Application No. 201180018812.3, dated Sep. 22, 2013.

Notice of Allowance received for corresponding Russian Patent Application No. 2012146409, dated Mar. 4, 2014, 14 pages, 2 pages of English Translation.

International Search Report received for corresponding Patent Cooperation Treaty Application No. PCT/FI2011/050308, dated Sep. 2, 2011, 4 pages.

Written Opinion received for corresponding Patent Cooperation Treaty Application No. PCT/FI2011/050308, dated Sep. 2, 2011, 7 pages.

International Preliminary Report of Patentability received for corresponding Patent Cooperation Treaty Application No. PCT/FI2011/050308, dated Oct. 16, 2012, 8 pages.

3rd Generation Partnership Project; Technical Specification Group Radio Access Network; Evolved Universal Terrestrial Radio Access (E-UTRA); LTE Positioning Protocol (LPP) (Release 9), 3GPP TS 36.XXX V0.1.0 (Oct. 2009) 18 pages.

Extended European Search Report for corresponding European Application No. 11768507.3 dated Sep. 23, 2015, 6 pages.

Examination Report for Vietnam Application No. 1-2012-03006 dated Aug. 11, 2016.

* cited by examiner

PERIODIC ASSISTANCE DATA FLOW CONTROL

RELATED APPLICATION

This application was originally filed as PCT Application No. PCT/FI2011/050308 filed Apr. 11, 2011, which claims priority to U.S. Provisional Application No. 61/323,298, filed Apr. 12, 2010.

FIELD

Various embodiments relate generally to the field of positioning technologies. More specifically, various embodiments relate to changing reference receivers for positioning purposes.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Navigation systems that allow for electronic device location determination are becoming increasingly widespread. There are currently a number of such navigation systems, including Global Navigation Satellite Systems (GNSS) such as the Global Positioning System (GPS), the Russian GLObal NAvigation Satellite System (GLONASS), the Satellite-Based Augmentation System (SBAS), the Local Area Augmentation System (LAAS), the Quasi-Zenith Satellite Systems (QZSS), and the future European system, Galileo. An exemplary GNSS can comprise a network of satellites that broadcasts navigation signals including time and distance data. GNSS receivers pick up these broadcasted navigation signals and calculate a precise global location based thereon.

One aspect of GNSS involves relative positioning. Relative positioning is a positioning technique in which one device is positioned with respect to another device. The goal of this positioning technique is to accurately determine the relative position (not necessarily the absolute position) or the baseline (the vector distance and direction between devices relative to each other) between the two devices. Relative positioning can be performed between two terminals or between a terminal and a reference station. In addition, relative positioning can be performed in a multi-baseline environment, where baselines are determined between multiple devices.

The simplest form of relative positioning involves determining the positional difference between two devices. Most relative positioning, however, involves high accuracy methods that generally achieve sub-decimeter (sub-dm) accuracies. One such commercially-deployed high accuracy positing method is Real-Time Kinematic (RTK). RTK is based on obtaining continuous periodic carrier and/or code phase measurements from two GNSS receivers, which can be terminals, virtual reference receivers (VRRs), and/or physical reference receivers, and linearly combining the measurements from the receivers in such a way that common mode errors cancel. For instance, when the baseline is short, atmospheric errors (troposphere, ionosphere) cancel almost completely.

In professional use, dual-frequency GPS receivers are typically used for relative positioning. The dual-frequency capability allows for, e.g., compensating the residual ionosphere errors. Alternatively, and in instances when the baseline is short and the common mode errors can be assumed to cancel, single-frequency receivers may be used. Accordingly, the shorter the baseline, the more straightforward and simpler solving the baseline accurately becomes.

As mentioned, positioning measurements can be made between terminals and VRRs. VRRs are computation reference receivers that are generated at a desired location and provided via a VRR Service to the requestor. In some instances, the VRR Service generates a single VRR on request to a desired location. In other instances, the VRR Service provides a large number of VRRs in a static grid. Thus, when a terminal needs to be positioned with respect to a VRR, the VRR closest to the terminal is chosen from the static grid. It should be noted that VRRs require the knowledge of the coarse location of the device to be positioned. This coarse location can be obtained using the conventional Assisted GNSS (AGNSS).

In one conventional deployment option, a VRR Service provider can operate a network of physical GNSS receivers to obtain reference measurements. These reference measurements can be used to enable the VRR Service provider to generate a VRR at any given location within the area covered by the GNSS network. The advantage of this is that a VRR can be generated at the location of the terminal to be positioned relative to the VRR. Hence, the baseline will be very short, and because of its computational nature, the location of the VRR is known very accurately. Thus, solving the baseline between the VRR and the terminal allows for determining the absolute location of the terminal at a very high accuracy level.

Within the context of Long Term Evolution (LTE), the $4^{th}$ generation of radio technology, GNSS-based positioning includes the LTE Positioning Protocol (LPP). Architecturally speaking, LPP is a protocol between a "target" and "server." The target is generally the User Equipment (UE) to be positioned, and the server is generally the node that provides the positioning instructions and assistance data to the target. It should be understood that "UE," as used herein, is intended to be an exemplary target. Furthermore, it should be understood that UEs can serve as both targets and servers from the LPP point of view. For example, in relative positioning between two UEs, one UE might be considered the server and the other UE might be considered the target. In this arrangement, the UE functioning as the server may request for code/carrier phase measurements from the other UE functioning as the target. The UE functioning as the server can thereby determine the baseline between the two UEs at a high accuracy based on the code/carrier phase measurements from the UE functioning as the target.

For high accuracy positioning to occur, a constant stream of reference measurement assistance data should flow from the server to the target. In the LPP specification (described in "3GPP TS 36.355 Stage 3" found on the 3GPP website), this occurs by the target sending a request referred to as a LPP Request Assistance Data message to the server. The server receives this message and responds with a LPP Provide Assistance Data message. Although the LPP specification allows for multiple successive LPP Provide Assistance Data messages, a target currently cannot request such continuous periodic assistance.

In addition to the typical "Request"-"Provide" interaction, the LPP specification also allows for the unsolicited provision of assistance data, wherein the server pushes assistance data to the target without the target first requesting it. This is useful when that the server knows that the target will likely request certain assistance data, e.g., in a UE-based GNSS-based session, in which the server can be sure that after commanding such a positioning method, the target will request for ephemerides. Thus, the server can act pro-actively and push the assistance data to the terminal without an explicit request.

In the LPP specification, the messaging is based on transactions within a LPP session. A LPP session is used to support a single location request and consists of transactions that each perform a single activity. For example, in the case of UE-initiated assistance data delivery, the LPP transaction consists of the LPP Request Assistance Data message (target to server) and one or more LPP Assistance Data Provide messages (server to target). That is, the LPP transaction consists of one request and one or more provide messages (or, in the unsolicited case, one or more provide messages).

In instances when a target needs to be positioned accurately with respect to a particular VRR (i.e., VRR-based relative positioning), there are at least two alternative deployments options. In a first deployment option, the VRR Service provides the Secure User Plane Location Protocol Location Platform (SLP) with a static grid of VRRs. For instance, the VRR service might provide the SLP with VRRs in a 10-km grid for a certain geographical area. When the target then needs to be positioned, the server selects the VRR closest to the target and starts providing reference measurements from that VRR to the target. In a second deployment option, the VRR is dynamically generated based on the request from the target, and measurements are provided with respect to that VRR.

Given the mobile nature of the various nodes involved in LPP, there are situations in which it is necessary and/or beneficial to change the target's associated VRR. For example, the VRR may need to be changed when the distance between the VRR and the target is too great due to, e.g., target movement. This is especially true in cases where the target is a single frequency receiver and thus requires a short baseline to keep good quality (as mentioned above). Another example of when the VRR may need to be changed occurs when the line of sight between the satellite and target deteriorates. For example, when the visibility between the satellite and the target is low, or when it is beneficial to have the baseline pointing in a certain direction, the target may decide to change the VRR to get a more stable baseline.

SUMMARY OF VARIOUS EMBODIMENTS

Various embodiments are directed to processes for efficiently and effectively changing the VRR associated with a particular target. In a first scenario, the target is aware of close-by VRRs (via a neighbor list) and requests a new transaction to effectuate the change to the "new" VRR. In a second scenario, the target requests a new transaction to effectuate the change to the "new" VRR, but is not aware of close-by VRRs. In a third scenario, the target is aware of close-by VRRs (via a neighbor list) and modifies the on-going transaction to effectuate the change to the "new" VRR. In a fourth scenario, the target also modifies the on-going transaction to effectuate the change to the "new" VRR, but is not aware of close-by VRRs. Thus, various embodiments change the VRR within the same assistance data session and the continuity of the reference measurements is guaranteed by doing a "soft handover" when switching from the "old" VRR to the "new" VRR. In the first and second scenario, this includes launching a new assistance transaction for the "new" VRR, and in the third and fourth scenario, this includes using a modify element in signaling the changes.

Various embodiments provide a method, apparatus, and computer-program product for determining that assistance data being received with respect to a first reference receiver should be replaced with assistance data with respect to a second reference receiver. A request message is transmitted to a server requesting assistance data with respect to the second reference receiver. Assistance data for the first reference receiver and the second reference receiver are received from the server. A measurement with respect to the second reference receiver is then determined, and the server is requested to cease transmission of the assistance data for the first reference receiver.

Various embodiments also provide a method, apparatus, and computer-program product for receiving, at a server, a request message requesting assistance data with respect to a second reference receiver. It is determined whether the requested assistance data with respect to the second reference receiver can be supplied. If the requested assistance data can be supplied, assistance data with respect to the second reference receiver in addition to assistance data with respect to a first reference receiver is transmitted. Additionally, in response to receiving a request to cease transmission of the assistance data with respect to the first reference receiver, transmission of such assistance data is ceased.

Although the following description of various embodiments focuses on changing VRRs in the context of LPP, it should be understood that this is merely exemplary and the general principles are applicable to any positioning protocol.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Various embodiments are described by referring to the attached drawings, in which.

DETAILED DESCRIPTION OF VARIOUS EMBODIMENTS

Figure 1:
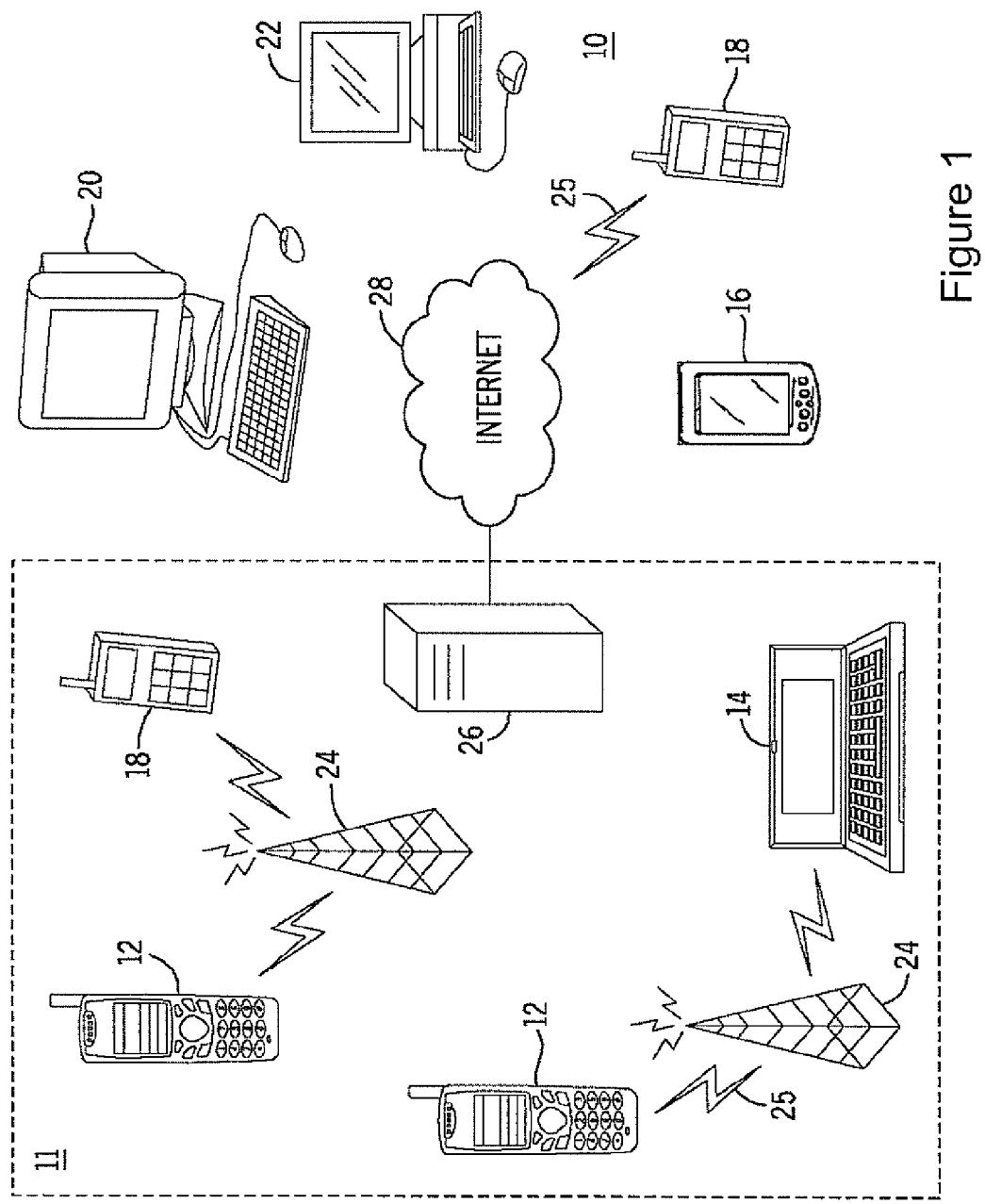
FIG. 1 is an overview diagram of a system within which various embodiments may be implemented.

FIG. 1 shows a system 10 in which various embodiments can be utilized, comprising multiple communication devices that can communicate through one or more networks. The system 10 may comprise any combination of wired or wireless networks including, but not limited to, a mobile telephone network (e.g., Global System for Mobile Communications (GSM), Wideband Code Division Multiple Access (W-CDMA), Code Division Multiple Access (CDMA), Long Term Evolution (LTE), Ultra Mobile Broadband (UMB), High Rate Packet Data (HRPD), and Worldwide Interoperability for Microwave Access (WiMax)), a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices or UEs of the system 10 may include, but are not limited to, a electronic device 12, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, CDMA, GSM, Universal Mobile Telecommunications System (UMTS), Time Division Multiple Access (TDMA), Frequency Division Multiple Access (FDMA), WiMax, Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 2:
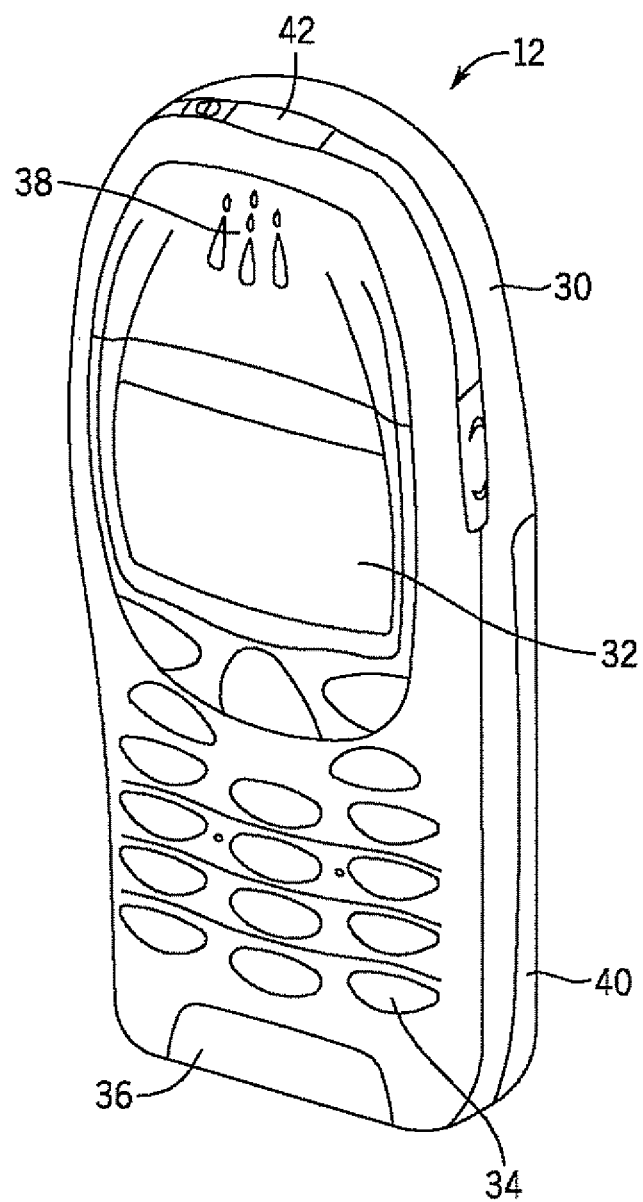
FIG. 2 is a perspective view of an electronic device that can be used in conjunction with the implementation of various embodiments.
Figure 3:
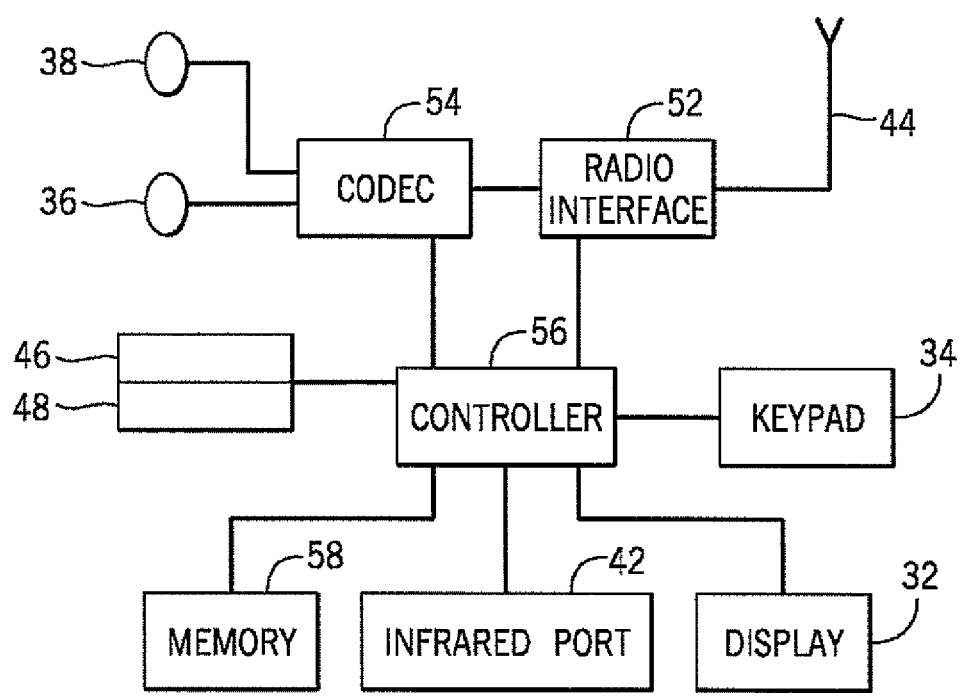
FIG. 3 is a schematic representation of the circuitry which may be included in the electronic device of FIG. 2.

FIGS. 2 and 3 show one representative electronic device or UE 12 within which various embodiments may be implemented and/or used in conjunction with the implementation of various embodiments. It should be understood, however, that the various embodiments are not necessarily intended to be limited to one particular type of device. The electronic device or UE 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art.

Figure 4:
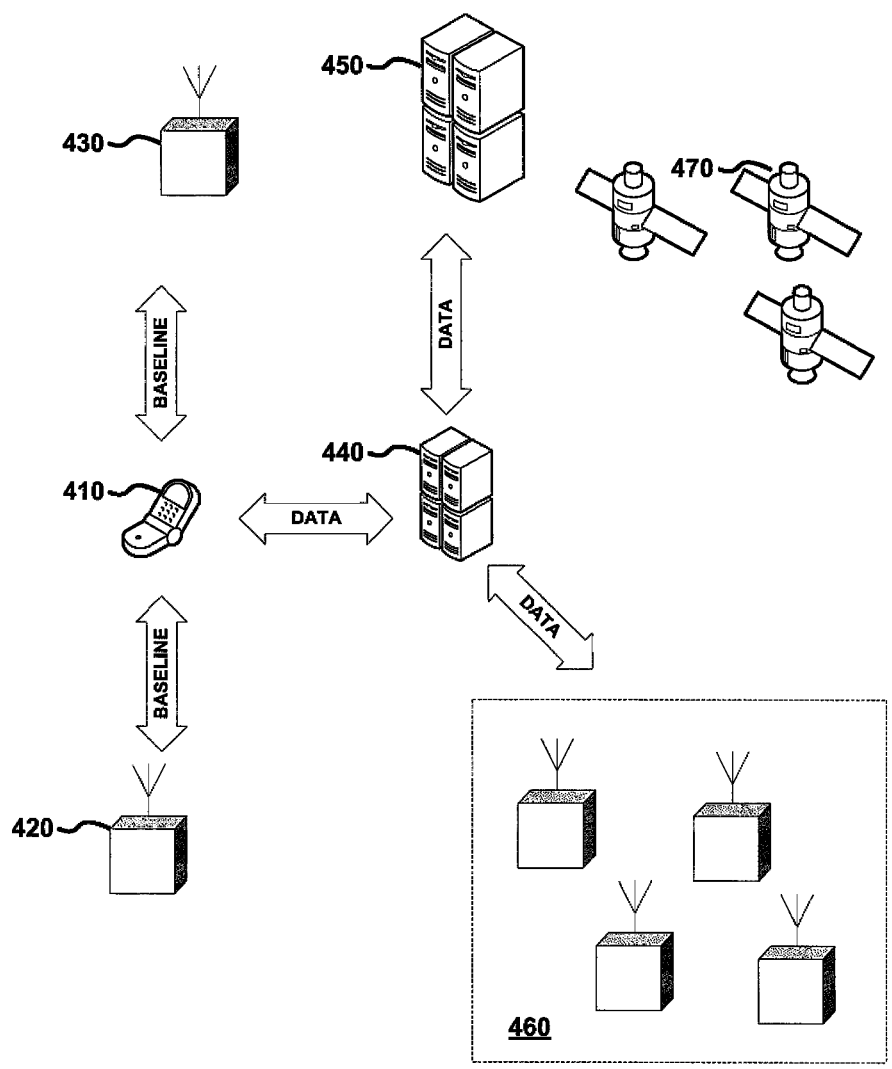
FIG. 4 illustrates an exemplary LPP aspect of the system 10 of FIG. 1.

FIG. 4 illustrates an LPP aspect of system 10 in FIG. 1, including a target 410, a first VRR 420 (i.e., a computational reference receiver as opposed to a physical reference receiver), a second VRR 430, a server 440, a VRR Service 450, a GNSS network 460 (e.g., comprising physical GNSS receivers), and various GNSS space vehicles (SVs) 470. The system may be used for high-accuracy positioning of the target 410. More precisely, the system may be used for high-accuracy positioning of a target 410 with respect to a VRR 420, 430. As indicated above, these VRRs 420, 430 can be dynamically created on request, or may be provided as part of a grid of VRRs that the VRR Service produces for the SLP 450 (i.e., SUPL Location Platform) to use. The SLP is a location platform that functions as the termination point for both User Plane Location Protocol (ULP), which is the location protocol of OMA SUPL, and LPP. The SUPL is an Open Mobile Alliance-standardized location protocol that provides the same functionality in the user plane, such IP-network, as the control plane positioning protocols provide in the control plane. In addition to positioning, SUPL also provides, amongst other functionalities, authentication, security and charging functionalities. From the protocol stack perspective LPP is encapsulated in ULP, i.e. ULP is a bearer protocol for LPP.

Figure 5:
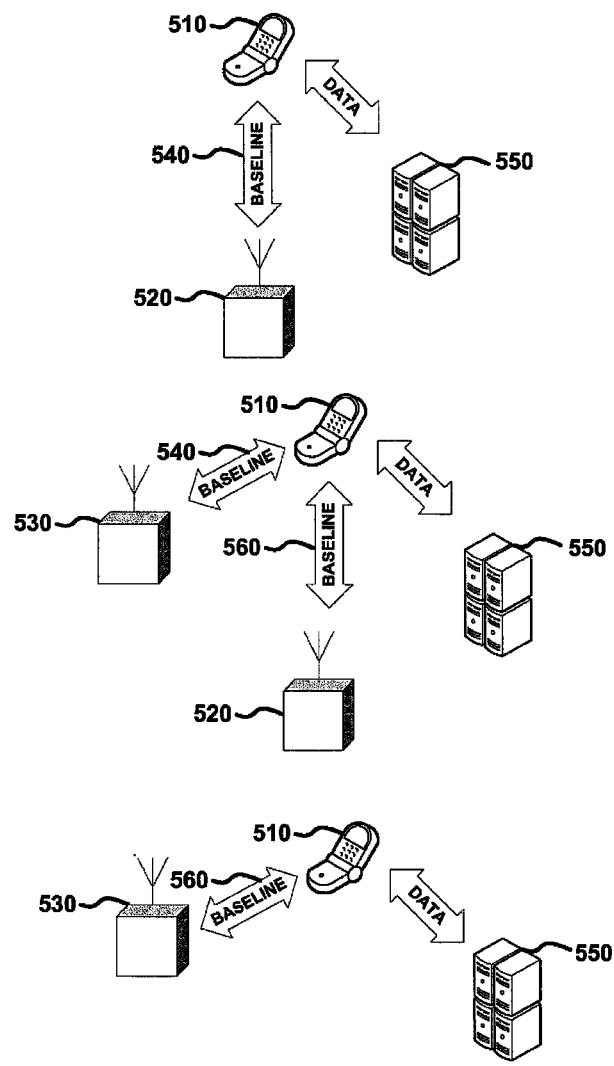
FIG. 5 illustrates an exemplary implementation of various embodiments.

FIG. 5 illustrates an exemplary process for switching from a first VRR 520 to a second VRR 530. The target 510 begins with a first fixed baseline 540 with respect to the first VRR 520. As used herein, "fixed baseline" means that integer ambiguities are solved and fixed to their integer values. This allows for solving the baseline at high accuracy. In instances when the ambiguities cannot be fixed, a float baseline may also be used. Although not as accurate as a fixed baseline, a float baseline can be solved in most circumstances, whereas a fixed baseline requires good GNSS signal conditions. When the float baseline is solved with respect to a nearby VRR, it produces a more accurate position solution that conventional AGNSS. The target 510 then determines the need for a VRR change. The target 510 requests measurements from the server 550 for a second VRR 530 that is, e.g., closer to the target 510 than the first VRR 520. The target 510 then starts to receive reference measurements for both the first VRR 520 and the second VRR 530. This situation allows for determining the second baseline 560 immediately, because the first VRR 520 and the second VRR 530 locations and the first baseline 540 are known: (The Second Baseline 560)=(The First Baseline 540)+((The Second VRR 530)−(The First VRR 520)). This knowledge of the second baseline 560 allows for solving new integer ambiguities easily. Once the target 510 is sure that it has captured the new baseline (i.e., the second baseline 560) and the associated integer ambiguities, the target 510 then requests the server 550 to stop providing measurements for the first VRR 520. Thus, in general, when changing the VRR, reference measurements for the "old" and "new" VRR are received for a short time, thereby allowing time for determining necessary parameters (integer ambiguities and baseline) with respect to the "new" VRR before terminating the measurements for the "old" VRR.

There are at least four scenarios for performing the VRR change, each of which is discussed in detail below. It should be understood that these four scenarios are not the only scenarios and that more scenarios are contemplated in accordance with various embodiments. The first two scenarios involve launching a "new" transaction to effectuate the VRR change, and are collectively referred to hereinafter as "Alternative 1." The other two scenarios involve sending a Modify information element within the above-mentioned LPP Request Assistance Data message to effectuate the VRR change, and are collectively referred to hereinafter as "Alternative 2." In some instances the Modify information element is encapsulated in the request messages, whereas, in other instances, the Modify information element is in a new message type. With Alternative 1, the actual VRR change is performed by the target requesting reference measurement assistance for a "new" VRR (i.e., a new transaction), and stopping the measurement assistance to the "old" VRR when the handover is complete. With Alternative 2, parameters of the ongoing session are modified and there is no need to launch another transaction.

In a simple UE-assisted situation, where position calculation is done in the server and the UE only provides the requested measurements to the server, the SLP has the information on the baseline and can take the necessary steps internally without interaction with the UE. Thus, there is no difference between Alternative 1 and Alternative 2 for UE-assisted situations. In a UE-based situation, however, position calculation is performed in the UE and, therefore, the VRR deployment architecture shown in FIG. 4 should be considered. As explained above, one option is to dynamically create VRRs on request, and the other is to have the VRR Service produce a grid of VRRs for the SLP to use. Because dynamically creating a VRR on request and producing a grid of VRR for the SLP to use differ, both options are explored below before a detailed discussion about the signaling involved in changing the VRR within the context of Alternative 1 and Alternative 2.

With regard to the grid option, when the SLP has a grid of VRRs from which to select, the server can provide the target with the closest VRR when the target requests for reference measurement assistance with a LPP Request Assistance Data message. It should be noted that in this instance, the target location is assumed to be known at some accuracy, e.g., based on conventional AGNSS fix. When the server responds with reference measurements assistance in a LPP Provide Assistance Data message, the server may also provide a neighbor list of the "close-by" VRRs, thus allowing the target to make a decision regarding which VRR to switch to, if necessary. Note that the VRRs in the neighbor list are associated with identifiers or unique numbers so that the target can point to a specific VRR when requesting for a VRR change. In addition to the above, the server might provide the target with a neighbor list in instances when the server does not have a grid of VRRs, but is providing a VRR to another target nearby. In such a case, there may also be a lifetime or duration indication associated with a VRR in the provided neighbor list.

Thus and with respect to Alternative 1 (i.e., when a VRR change launches a "new" transaction), the neighbor list works as guiding information for the target as to when it is advantageous to change the VRR. In Alternative 2 (i.e., when a VRR change is performed by sending a Modify information element within the LPP Request Assistance Data message), inclusion of a neighbor list indicates to the target that the server is capable of VRR change, and that the server is able to provide reference measurements for two VRRs at a time. Note that this capability is irrelevant in the alternative 1, because the two transactions (the old and the new) are more or less independent of each other.

Moving on to the dynamic creation option (i.e., the option to dynamically create VRRs on request), with respect to Alternative 1, the target requests another VRR in a new position. In this case, it is useful for the target to inform the server of the transaction ID of the on-going VRR stream. This information notifies the server that the target is doing a hand-over and, therefore, the server does not accidentally terminate the current VRR stream having started providing a new VRR stream. Moreover, when referring to the transaction ID of the currently ongoing VRR session, the server can directly take some provision parameters (e.g., for which GNSSs and signals to provide assistance) from the current session to the new session. In Alternative 2, an option to handle the dynamic creation option is to include, in the LPP Provide Assistance Data message, an indication from the server to the target that the target may request for a VRR change, i.e., that the server is able to provide reference measurements for two VRRs at a time.

It should be noted that current LPP specification (Release 9) only allows for one LPP Assistance Data Request message per transaction. Thus and as mentioned, a transaction currently consists of one request and one or more provide messages (or, in unsolicited cases, one or more provide messages). Accordingly, in Alternative 1, there will necessarily be a new transaction because a new request message is sent. Conversely, in Alternative 2, there will be no new transaction but rather a modification to the current transaction. Regardless of alternative, the request message may contain cell ID/position so that a VRR can be assigned to the UE. In the event that there is no position information in the request, the server may commence a positioning session with the target so that server obtains, e.g., the coarse position of the target. In the LPP Assistance Data Request message, the UE may define the desired maximum distance to the VRR (i.e., Quality of Reference). This distance to the VRR may have a direct impact on the quality of the high accuracy position determination.

In light of the foregoing, the LPP Provide Assistance Data message from the server for VRR reference measurement assistance may, in addition to other possible information, include the following with respect to Alternative 1:

(i) reference measurement assistance for the current VRR;

(ii) a neighbor list, i.e., the coordinates of the close-by VRRs; and (iii) a hand-over command for forced hand-over (discussed below).

With respect to Alternative 2, the LPP Provide Assistance Data message from the server for VRR reference measurement assistance may include:

(i) reference measurement assistance for the current VRR;

(ii) reference measurement assistance for the VRR to which the "target" is changing to;

(iii) a neighbor list, i.e. the coordinates of the close-by VRRs; and (iv) an indication that the "target" may request for a VRR change.

Now turning to the actual signaling for changing the VRR, below is a detailed discussion regarding the signaling for Alternative 1 and Alternative 2. Each alternative is separated into two scenarios, based on whether or not the target has a neighbor list.

Alternative 1, Scenario 1

As mentioned above, in Alternative 1, the actual VRR change is performed by requesting reference measurement assistance for a "new" VRR, and then stopping the measurement assistance delivery to the "old" VRR when the hand-over is complete. In instances when the target has determined that it wants to change the VRR and it has the neighbor list including coordinates of possible VRRs, the target initiates a new transaction by sending a LPP Request Assistance Data message to the server. In the request message, the target includes a RefStationChangeRequest information element (IE). The RefStationChangeRequest IE includes the TransactionID of the current on-going VRR assistance data stream. The reason for including the TransactionID of the on-going VRR assistance data stream was explained above, i.e., to prevent the server from stopping the stream for the "old" or on-going VRR immediately after starting to provide a "new "stream. Additionally, in the RefStationChangeRequest IE, a newRefStationReqWithID is included, which provides the target the ID of the "new" VRR the target desires to change to. The target obtains this ID information from the neighbor list it possesses. Subsequently, the server receives the message and, in cases when the server can provide the data for the "new" VRR, the server begins providing the target with VRR reference measurement assistance according to the request. When the target has completed the VRR change, the target aborts the "old" VRR reference assistance transaction by asking the sever to discontinue transmission of reference assistance data for the "old" VRR (e.g., via a LPP Abort message including the appropriate transaction ID). On the other hand, when the server receives the message and determines that it cannot provide the data for the new VRR, the server aborts the new transaction.

Figure 6:
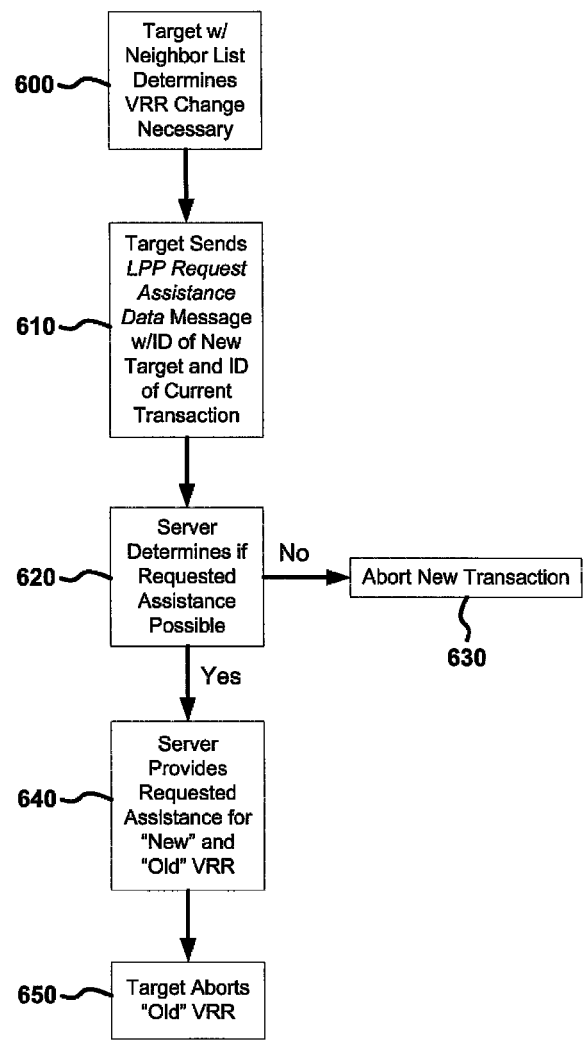
FIG. 6 is a flow chart illustrating an exemplary implementation of various embodiments in which the target has a neighbor list.

FIG. 6 is a flow chart illustrating the processes associated with this embodiment. At 600, a target with a neighbor list determines that a change is necessary or would be beneficial. At 610, the target sends to the server a LPP Request Assistance Data message including a RefStationChangeRequest IE including the TransactionID of the current VRR assistance data stream. Additionally, in a newRefStation-ReqWithID field associated with the RefStationChangeRequest IE, the target includes an ID of a VRR from the neighbor list for which the target would like to switch to. At 620, the server receives LPP Request Assistance Data message and determines if it can provide the reference measurement assistance requested. If the server cannot provide the reference measurement assistance requested, the server aborts the new transaction at 630. If, however, the server can provide the reference measurement assistance requested, the server begins, at 640, providing the reference measurement assistance requested for the "new" VRR in the new transaction in addition to the reference measurement assistance already being provided for the "old" VRR in an on-going transaction. At 650, once the target has successfully changed over to the "new" VRR, the target aborts the "old" VRR reference assistance transaction. As mentioned above, this may be accomplished by sending a LPP Abort message with transaction ID to be discontinued.

Alternative 1, Scenario 2

Next, instances when the target does not have a neighbor list are described in accordance with various embodiments. The absence of a neighbor list may be due to a number of reasons, including an architecture having dynamic VRRs or because the server simply did not include the neighbor list in the message. Although the description below pertains to instances when no neighbor list is present, it should be understood that the below process may occur even when the target has the neighbor list.

In this alternative, the target functions in a similar manner as described above, a difference being that the RefStationChangeRequest IE includes newRefStationReqWithCoords IE, which indicates a position for the new VRR in terms of coordinates, instead of the newRefStationReqWithID mentioned-above. One reason for using/providing coordinates instead of a specific ID is because the target, in this scenario, may not possess a neighbor list and therefore does not know the ID of neighboring VRRs.

It should be noted that, in some scenarios, the target may request a new VRR at a location that is different from the current location of the target. For example, the target may request a location based on the projected movement of the target.

Figure 7:
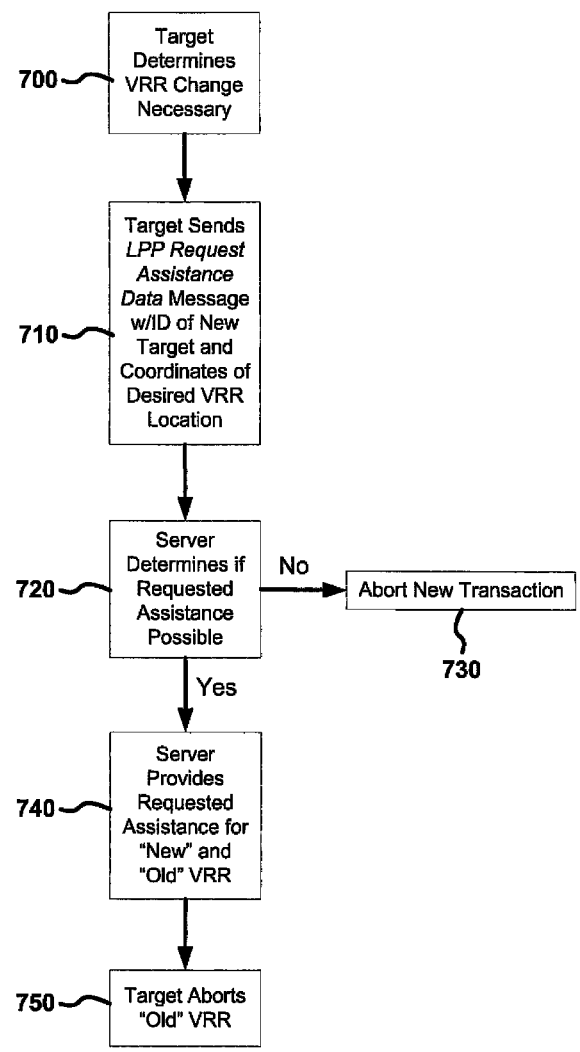
FIG. 7 is a flow chart showing an exemplary implementation of various embodiments in which the target does not have a neighbor list.

FIG. 7 is a flow chart illustrating the processes associated with this embodiment. At 700, a target determines that a change is necessary and/or would be beneficial. As mentioned above, the target may or may not possess a neighbor list. At 710, the target sends to the server a LPP Request Assistance Data message. The LPP Request Assistance Data message includes the TransactionID and newRefStationReqWithCoords. TransactionID includes the ID of the current VRR assistance data stream. And the newRefStationReqWithCoords IE includes desired coordinates for a "new" VRR. At 720, the server receives LPP Request Assistance Data message and determines if it can provide the reference measurement assistance requested. If the server cannot provide the reference measurement assistance requested, the server aborts the new transaction at 730. If, however, the server can provide the reference measurement assistance requested, the server begins, at 740, providing the reference measurement assistance requested in a new transaction for the "new" VRR in the location requested, in addition to the reference measurement assistance already being provided in an on-going transaction for the "old" VRR. At 750, once the target has successfully changed over to the "new" VRR, the target aborts the "old" VRR reference assistance transaction.

Below is a listing of exemplary information elements for Alternative 1. This exemplary Abstract Syntax Notation One (ASN.1) code illustrates an exemplary implementation of various embodiments. It should be noted that the below ASN.1 code illustrates an exemplary notation that describes the data structure for, e.g., representing, encoding/decoding, and transmitting data in accordance with various embodiments. It should be further understood that the exemplary ASN.1 code presented below may define messages for use in an appropriate communication protocol, resulting in binary encoding, via the use of any number of, e.g., ASN.1 encoding rules.

Exemplary Information Elements, Alternative 1

```
Request ::= SEQUENCE {
    transactionID          TransactionID,
    requestOfHaAssistance  RequestOfHaAssistance,
}
RequestOfHaAssistance ::= SEQUENCE {
    refStationReq          RefStationReq OPTIONAL,
```

-continued

```
        refStationChangeRequest    RefStationChangeRequest OPTIONAL,
    }
    RefStationReq ::= SEQUENCE {
        coordinates              Coordinates, --Position to which Reference Station is
    requested
        measurementsRequested    MeasurementsRequested, --Defines the GNSSs and
    signals requested
        qualityOfRefStation      QoR OPTIONAL, --maximum distance to the
    reference station
    }
    RefStationChangeRequest ::= SEQUENCE {
        CurrentTransaction           TransactionID,
        newRefStationReqWithCoords   RefStationReq OPTIONAL, --Request with
    coordinates
        newRefStationReqWithId       RefStationID OPTIONAL, --Request with
        ID
    }
    Provide ::= SEQUENCE {
        transactionID       TransactionID,
        provideHaAsssistanceProvideHaAsssistance,
    }
    ProvideHaAsssistance ::= SEQUENCE {
        measurements       Measurements,
        neighborlist       Neighborlist OPTIONAL,
        handOverCommand    TransactionID OPTIONAL,
    }
    Measurements ::= SEQUENCE {
        gNSSMeasurements   GNSSMeasurements, --This contains Carrier Phase/Code
    phase measurements for the request GNSSs and signals, "server" could deduce, which
    to send based on, say, the "target" capabilities provided to the "server" in LPP Provide
    Capabilities or based on the parameters in the request
        coordinates             Coordinates, --Coordinates of the VRR
    }
    NeighborList ::= SEQUENCE (1..16) OF Neighbor -- NOTE: "16" neighbors is
    exemplary
    Neighbor ::= SEQUENCE {
        coordinates    Coordinates,
        refStationId   RefStationID,
    }
RefStationID ::= INTEGER(0..65535) -- Note: "65535" IDs is an exemplary range
TransactionID ::= INTEGER(0..255) -- Note: "255" transactions IDs is exemplary
```

Alternative 2

Embodiment 3

As discussed previously, Alternative 2 differs from Alternative 1 in that the actual VRR change is performed with a Modify information element in the LPP Request Assistance Data message. The purpose of the Modify IE is to change the parameters (i.e. the VRR used) of the ongoing session. In this case it is assumed that an LPP transaction can in fact include multiple LPP Request Assistance Data messages, i.e. a new request message does not trigger a new transaction. Thus, the Modify IE can be embedded in the LPP Request Assistance Data message. Therefore, when the target wishes to modify the parameters, it can simply send a LPP Request Assistance Data message to the server and not trigger a new transaction. This request message with the Modify IE has the same transaction ID as the on-going transaction and, hence, the server can associate the modification request to the correct transaction.

It should be understood that that the Modify IE could also be its own message type, such as LPP Modify Assistance Data. This message would then be used similarly to the Modify IE detailed below. The LPP Modify Assistance Data would naturally then have the same transactions ID as the currently on-going assistance data transaction allowing the server to associate the modification request to the correct transaction.

In instances when the target has the neighbor list (including the coordinates of the possible VRRs nearby), the target knows, at least implicitly, that the server is capable of the signaling required for the VRR change. Thus, the target sends a first LPP Request Assistance Data message with the Modify IE requesting a VRR change and including the ID of one of the VRRs from the neighbor list in a changeTo IE. In response, the server begins providing reference measurement assistance for the VRR indicated in the Modify IE, in addition to the reference measurement assistance already being provided. The target then performs the necessary steps to change the VRR. Having done so, the target sends the server a second "LPP Request Assistance Data message with the Modify IE, in which the target tells the server, via the stop IE, to stop sending measurements for the "old" VRR. Thus, in addition to the VRRs in the neighbor list requiring unique IDs, the active or "old" VRR also requires an ID so that the target can name the VRR when requesting for the server to stop providing measurements. Alternatively, it is possible to end transmission of the measurements for the "old" VRR by indicating the coordinates of the VRR that the target wishes to stop. The use of IDs, however, is more straightforward and unambiguous.

It should be noted that there may be situations in which the server may be unable to provide the measurements for the second VRR. In such situations, the server may signal this inability to the target through an error code. Alternatively, the server may simply not provide the data requested for the second VRR. Thus, the target should not assume that it will be able to change the VRR.

Figure 8:
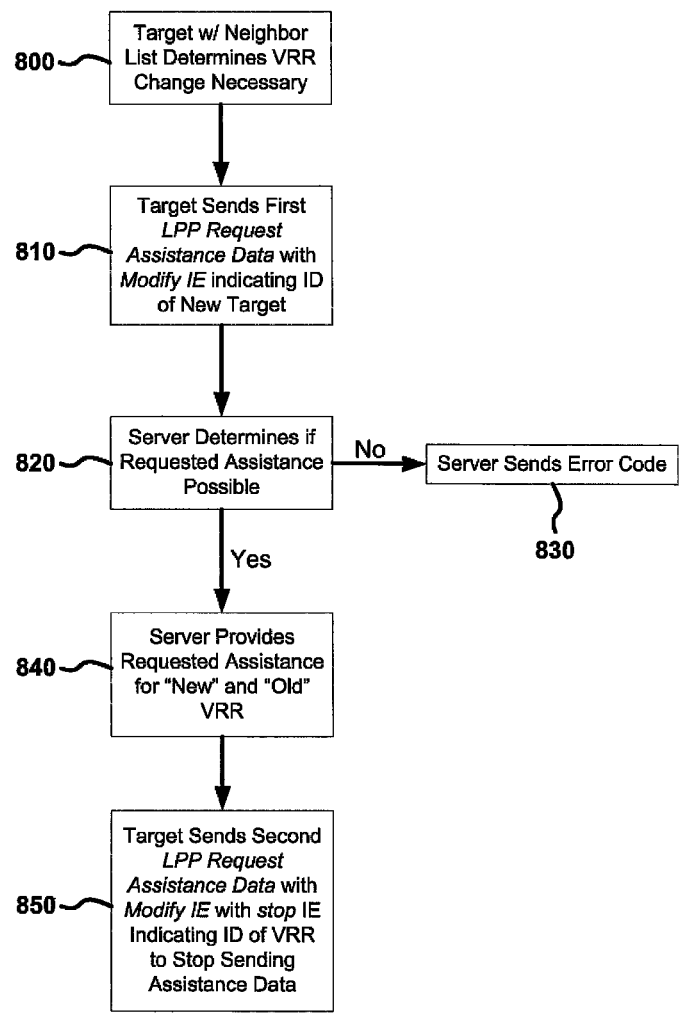
FIG. 8 is a flow chart showing an exemplary implementation of various embodiments in which the target has a neighbor list.

FIG. 8 is a flow chart illustrating the processes associated with this embodiment. At 800, a target with a neighbor list determines that a VRR change is necessary and/or would be beneficial. As mentioned above, the inclusion of neighbor list is an indication that the server is capable of handling the VRR change. At 810, the target sends to the server a first LPP Request Assistance Data message with Modify IE indicating an ID of "new" Target for which the target would like to receive assistance data with respect to. At 820, the server determines if such assistance data can be provided. If the server cannot provide such assistance data, at 830, the server sends an error code to the target. Alternatively and as mentioned above, the server may not send an error code and may simply not provide the assistance data requested. If, however, the server can provide the assistance data, at 840, the server provides the requested assistance data for the "new" VRR as well as assistance data for the "old" or on-going VRR. The target receives this information and proceeds to change from the "old" VRR to the "new" VRR. Once this process is sufficiently complete, at 850, the target sends the server a second LPP Request Assistance Data message with a Modify IE and a stop IE indicating the ID of the "old" or "active" VRR to stop sending assistance data for.

Alternative 2

Embodiment 4

For situations when the target determines that a VRR change is necessary and the target does not have a neighbor list, the target sends the server a first LPP Request Assistance Data message with a Modify IE. Unlike the previous situation, however, where an ID of a neighboring VRR is included, in this situation, positional information (current or desired) is sent. That is, instead of giving the VRR ID as the parameter in the Modify IE, when requesting for a VRR change, the target provides coordinates. In addition, the target may send a qualityOfRefStation IE defining, e.g., the maximum allowed distance to VRR. The remaining GNSS signals may stay the same as mentioned above. The server receives this information and starts providing reference measurement assistance for the two VRRs. The target then performs the VRR change and terminates the reference measurement assistance stream from the old VRR by providing a second LPP Request Assistance Data message with a Modify IE and stop IE indicating the ID of the VRR to be terminated.

It should be noted that, even if there is not an indication that a VRR change is possible, the target might still request for a change. If the server cannot provide assistance for two VRRs simultaneously for change purposes, the target will, as discussed above, receive an error code or simply no assistance data requested.

Also, it should be noted that this is a possible mechanism even if there is a grid-based VRR deployment in the background. The server would simply tell the target that the VRR change is possible (in the LPP Provide Assistance Data message) with refStationChangeOk and the target would then request a new VRR at the desired position. The use of the refStationChangeOk in the LPP Provide Assistance Data message is beneficial because the current implementation of LPP (Release 9) does not have a defined message for the server to provide its capabilities to a target. That is, in the LPP Release 9, the target cannot request server capabilities, and therefore sending a refStationChangeOk with a LPP Provide Assistance Data message is beneficial to inform the target that the server is capable of supporting the VRR change.

It should be understood, however, that providing server capability information (e.g., that the server is capable of supporting a VRR change) in a separate capability message from the server to the target is an alternative option to the above. That is, an alternative to providing a refStationChangeOk message within the LPP Provide Assistance Data message is to send a server capability message from the server to the target.

Figure 9:
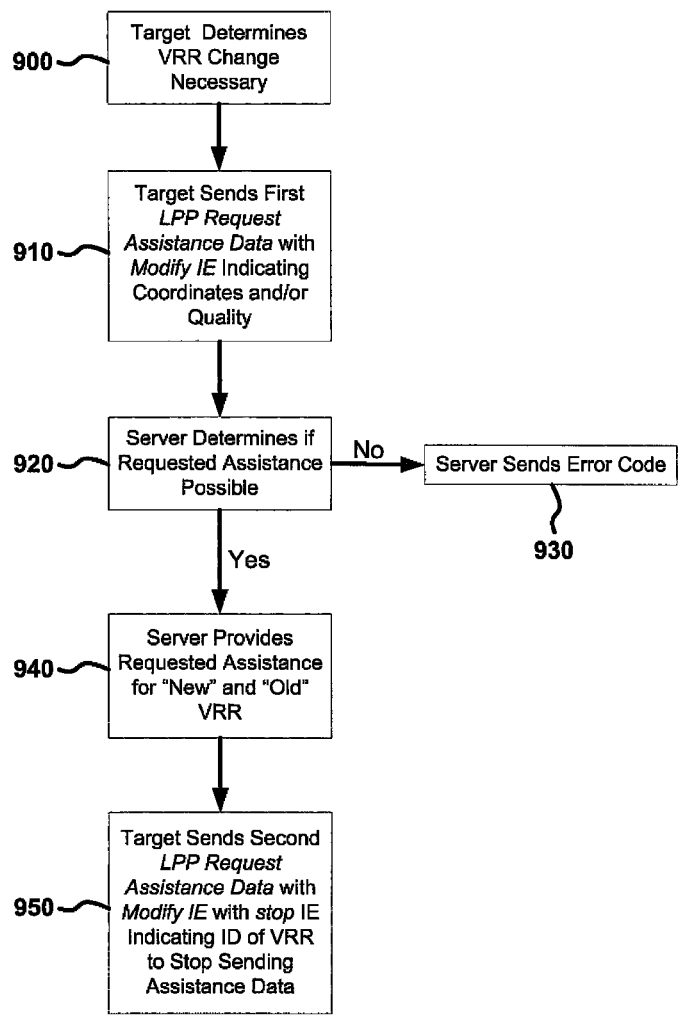
FIG. 9 is a flow chart showing an exemplary implementation of various embodiments in which the target does not have a neighbor list.

FIG. 9 is a flow chart illustrating the processes associated with this embodiment. At 900, a target determines that a VRR change is necessary or would be beneficial. At 910, the target sends to the server a first LPP Request Assistance Data message with a Modify IE indicating particular coordinates and, optionally, quality information. At 920, the server determines if such assistance data can be provided. If the server cannot provide such assistance data, at 930, the server sends an error code to the target. If, however, the server can provide the assistance data, at 940, the server provides the requested assistance data for the "new" VRR as well as assistance data for the "old" or on-going VRR. The target receives this information and proceeds to change from the "old" VRR to the "new" VRR. Once this process is sufficiently complete, at 950, the target sends the server a second LPP Request Assistance Data message with a Modify IE and a stop IE indicating the ID of the VRR to terminate.

Below is a listing of exemplary information elements for Alternative 2. This exemplary Abstract Syntax Notation One (ASN.1) code illustrates an exemplary implementation of various embodiments. It should be noted that the below ASN.1 code illustrates an exemplary notation that describes the data structure for, e.g., representing, encoding/decoding, and transmitting data in accordance with various embodiments. It should be further understood that the exemplary ASN.1 code presented below may define messages for use in an appropriate communication protocol, resulting in binary encoding, via the use of any number of, e.g., ASN.1 encoding rules.

Exemplary Information Elements, Alternative 2

```
Request ::= SEQUENCE {
    transactionID      TransactionID,
    requestOfHaAssistance    RequestOfHaAssistance,
}
RequestOfHaAssistance ::= SEQUENCE {
    refStationReq      RefStationReq OPTIONAL,
    modify             Modify OPTIONAL,
}
RefStationReq ::= SEQUENCE {
    coordinates         Coordinates, --Position to which Reference Station is
requested
    measurementsRequested   MeasurementsRequested OPTIONAL, --Defines the
GNSSs and signals requested, server might deduce this information also based on the
```

-continued

```
target capabilities
    qualityOfRefStation  QoR OPTIONAL, --maximum distance to the reference
station
    }
Modify ::= SEQUENCE {
    changeTo          ChangeTo OPTIONAL,
    stop              RefStationID OPTIONAL,
    }
ChangeTo ::= SEQUENCE {
    newRefStation      RefStationReq OPTIONAL,
    newRefStationId    RefStationID OPTIONAL,
    }
Provide ::= SEQUENCE {
    transactionID      TransactionID,
    provideHaAsssistanceProvideHaAsssistance,
    }
ProvideHaAsssistance ;:= SEQUENCE {
    measurementsList   MeasurementsList,
    neighborlist       Neighborlist OPTIONAL,
    refStationChangeOk BOOLEAN,
    }
MeasurementsList ::= SEQUENCE (1..2) OF Measurements
Measurements ::= SEQUENCE {
    gNSSMeasurements  GNSSMeasurements, --This contains Carrier Phase/Code
phase measurements for the request GNSSs and signals, "server" could deduce these
based on, say, the "target" capabilities provided to the "server" in LPP Provide
Capabilities or based on the parameters in the request
    coordinates       Coordinates, --Coordinates of the VRR
    refStationID      RefStationID,
    }
NeighborList ::= SEQUENCE (1..16) OF Neighbor -- NOTE: "16" neighbors is
exemplary
Neighbor ::= SEQUENCE {
    coordinates       Coordinates,
    refStationId      RefStationID,
    }
RefStationID ::= INTEGER(0..65535) -- Note: "65535" IDs is an exemplary range
TransactionID ::= INTEGER(0..255) -- Note: "255" transaction IDs is exemplary
```

LPP (Release 9) provides the potential to carry capabilities from the target to the server. These target capabilities are carried to the server in a LPP Provide Capabilities message. The LPP Provide Capabilities message can be provided in response to a request, or without an explicit request from the server (i.e., unsolicited). These capabilities are beneficial because, e.g., they can help determine which measurements to provide to the target. For example, in the above-mentioned request messages, an optional field can be used to by the target to indicate which GNSSs and GNSS signals it wishes to receive in reference measurement assistance. Thus, as indicated in the ASN.1 code, if there is no measurementsRequested, then the server deduces which measurements to provide based on the capabilities messaging, which may have to be requested from the target. To summarize, the server knows which measurements to provide the target based either on the capability request/provision messaging, or based on the explicit request in the measurementsRequested in RefStationReq.

Notably, in the LPP Request/Provide Capabilities exchange, the server can determine if the target is capable of conducting a hand-over. As discussed below, this hand-over knowledge is useful, e.g., in cases of forced hand-over. Another notable item that can be carried in the LPP Request/Provide Capabilities exchange is the target's capability for a multi-baseline solution, i.e., whether or not the target is capable of receiving reference measurement assistance for a plurality of receivers and solving the baseline with respect to all the reference receivers. Note that this is different from the VRR change, but could also be utilized in that purpose.

Forced hand-over involves a decision by the server on behalf of the target to begin receiving reference measurements for a second VRR. In response to the initiation of such a forced hand-over, the target is supposed to switch to the "new" VRR and cease use of the "old" VRR. Forced hand-over may occur in situations when the server knows the baseline, i.e., when the target reports the baseline to the server. Based on this knowledge, the server may command the forced hand-over to a new VRR due to the resource issues, efficiency, effectiveness, etc.

Alternative 1, Forced Handover

In Alternative 1, the server can give the target a hand-over command in a ProvideHaAssistance IE. This hand-over command carries with it a transaction ID of the new transaction within which the server starts to push the target reference measurement assistance information for the new VRR. Once the target performs the VRR change, the target can stop the old VRR transaction by sending an abort for that transaction. In case the target is unable to execute the VRR change, the target simply aborts the new transaction and provides, e.g., the server the target capabilities indicating the target is not capable of the VRR change. Obviously, if the server knows the target capabilities and knows that the target cannot perform the VRR change, the server should not attempt the forced handover.

Alternative 2, Forced Handover

In Alternative 2, if the server knows that the target is capable of doing the change, then the server may simply start providing reference measurement assistance for two VRRs (old and new). The server may know this for example based on the capabilities mentioned above.

In the ANS.1 code above, the MeasurementList can carry measurements for two VRRs. It might be specified that in cases where there are measurement for two VRRs, the target must switch to the one target it is not currently using. Another exemplary method to signal the hand-over command may include using an explicit Boolean field that tells the target that it must switch to a particular VRR.

If the SLP does not know if the target is capable of such handover, another solution is required. One such solution is to define that the target shall immediately stop the stream of reference measurement assistance for the new VRR by sending to the server a LPP Request Assistance Data message with a Modify IE carrying a stop IE command with the VRR ID of the new VRR.

In instances where the server knows that the UE is capable of doing the change, but for some reason the UE wishes to reject the change command, the UE can do so by stopping the stream of reference measurement assistance for the new VRR. Alternatively, the UE can respond to a handover request with "hand-over proceed" or "hand-over reject." If "hand-over proceed" is sent from the UE, the handover is performed in the known manner after which the UE could answer by "hand-over complete" and the server can stop providing reference measurement assistance for the old VRR. It should be noted that such signaling is not shown in the above examples.

Alternative 3

In addition to the above, there is a further alternative, Alternative 3, that does not depend on LPP transaction IDs or the LPP high level session control, i.e., it is not dependent on whether the request launches a new transaction or not. In this alternative, the periodic assistance session flow control is handled using the "Periodic Session ID." This could be assigned by the server when the periodic assistance data session is launched. As shown below in the exemplary information elements for Alternative 3, each periodic assistance data provision includes the ID so that the interlinked messages within the periodic assistance data delivery can be linked in the receiving end. Further, any modifications to the session (change of VRR) are handled via the "PerSessionID" so that the changes to the assistance data delivery can be pointed to the right session. This alternative also allows for the Modify IE to be carried in a separate, dedicated LPP message, such as a LPP Modify Assistance Data message, which however does not exist in the current LPP (Release 9)

An exemplary handover or change of VRR in Alternative 3 may proceed as follows. The UE initially receives reference measurement assistance for a first VRR. Upon the UE determining that a change to a second VRR may be beneficial (e.g., based on a neighbor list), the UE may send a Modify IE including the ID of the second VRR in the changeTo IE. The server receives this message and may begin providing reference measurement assistance for the second VRR in addition to the first VRR. The UE then proceeds to change VRRs. Once complete, the UE stops the flow of measurements for the first VRR by sending a Modify IE including the stop-field.

Below is a listing of exemplary information elements for Alternative 3. This exemplary Abstract Syntax Notation One (ASN.1) code illustrates an exemplary implementation of various embodiments. It should be noted that the below ASN.1 code illustrates an exemplary notation that describes the data structure for, e.g., representing, encoding/decoding, and transmitting data in accordance with various embodiments. It should be further understood that the exemplary ASN.1 code presented below may define messages for use in an appropriate communication protocol, resulting in binary encoding, via the use of any number of, e.g., ASN.1 encoding rules.

```
Request ::= SEQUENCE {
    transactionID        TransactionID,
    requestOfHaAssistance    RequestOfHaAssistance,
}
RequestOfHaAssistance ::= SEQUENCE {
    refStationReq        RefStationReq OPTIONAL,
    modify               Modify OPTIONAL,
}
RefStationReq ::= SEQUENCE {
    coordinates                Coordinates, --Position to which Reference Station is
requested
    measurementsRequested      MeasurementsRequested OPTIONAL, --Defines the
GNSSs and signals requested, alternatively the server might know, which
measurements to provide based on the on-going periodic session details or based on the
terminal capabilities
    qualityOfRefStation        QoR OPTIONAL, --maximum distance to the
reference station
}
Modify ::= SEQUENCE {
    PeriodicSessionToModify    PerSessionID,
    changeTo                   ChangeTo OPTIONAL,
    stop                       RefStationID OPTIONAL,
}
ChangeTo ::= SEQUENCE {
    newRefStation        RefStationReq OPTIONAL,
    newRefStationId      RefStationID OPTIONAL,
}
Provide ::= SEQUENCE {
    transactionID        TransactionID,
    provideHaAsssistanceProvideHaAsssistance,
}
ProvideHaAsssistance ::= SEQUENCE {
    PeriodicSessionID    PerSessionID,
    measurementsList     MeasurementsList,
```

```
    neighborlist          Neighborlist OPTIONAL,
    refStationChangeOk    BOOLEAN OPTIONAL, --NOTE: shall be included in case
server supports VRR change, but does not provide neighbor list
    }
MeasurementsList ::= SEQUENCE (1..2) OF Measurements
Measurements ::= SEQUENCE {
    gNSSMeasurements     GNSSMeasurements, --This contains Carrier Phase/Code
phase measurements for the request GNSSs and signals, "server" could deduce these
based on, say, the "target" capabilities provided to the "server" in LPP Provide
Capabilities or based on the parameters in the request
    coordinates           Coordinates, --Coordinates of the VRR
    refStationID          RefStationID,
    }
NeighborList ::= SEQUENCE (1..16) OF Neighbor -- NOTE: "16" neighbors is
exemplary
Neighbor ::= SEQUENCE {
    coordinates      Coordinates,
    refStationId     RefStationID,
    }
RefStationID ::= INTEGER(0..65535) - Note: "65535" IDs is an exemplary range
PerSessionID ::= INTEGER(0..255) -- Note: "255" session IDs is exemplary
TransactionID ::= INTEGER(0..255) -- Note: "255" transaction IDs is exemplary
```

The various embodiments described herein are described in the general context of method steps or processes, which may be implemented in one embodiment by a computer program product, embodied in a non-transitory computer-readable medium, including computer-executable instructions, such as program code, executed by computers in networked environments. A non-transitory computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Additionally, the various embodiments may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

A method, comprising:
  determining, at a target device, that first assistance data being received should be replaced with second assistance data;
  transmitting a request message requesting the second assistance data;
  receiving the first assistance data and the second assistance data;
  determining a measurement with respect to the second assistance data; and
  requesting ceasing transmission of the first assistance data.

The method, wherein the first assistance data is associated with a first reference receiver and the second assistance data is associated with a second reference receiver.

The method, wherein the first and second reference receivers are virtual reference receivers.

The method, wherein the measurement comprises a baseline with respect to the second reference receiver.

The method, wherein the request message includes an identifier of the second reference receiver.

The method, wherein the identifier of the second reference receiver is determined from a list including neighboring reference receivers.

The method, wherein the request message includes an identifier of a transaction between the target and the first reference receiver.

The method, wherein the request message includes coordinates for the second reference receiver.

The method, wherein the request message includes a quality requirement such that parameters associated with the second reference receiver comply with the quality requirement.

The method, wherein the first assistance data is associated with a first transaction, and the second assistance data is associated with a second transaction.

The method, wherein the first assistance data and the second assistance data are associated with the same transaction.

The method, wherein a modify information element is sent with the request message and a new transaction is not launched for the second assistance data.

A computer program product, embodied on a non-transitory computer-readable medium, comprising, computer code including computer-executable instructions that cause a processor to perform the above processes.

An apparatus, comprising:
a processor; and
a memory unit communicatively connected to the processor, and including computer code configured to, operating with the processor, cause the apparatus to:
  determine that first assistance data being received should be replaced with second assistance data;
  transmit a request message requesting the second assistance data;
  receive the first assistance data and the second assistance data;
  determine a measurement with respect to the second assistance data; and
  request that transmission of the first assistance data cease.

The apparatus, wherein the first assistance data is associated with a first reference receiver and the second assistance data is associated with a second reference receiver.

The apparatus, wherein the first and second reference receivers are virtual reference receivers.

The apparatus, wherein the measurement comprises a baseline with respect to the second reference receiver.

The apparatus, wherein the request message includes an identifier of the second reference receiver.

The apparatus, wherein the identifier of the second reference receiver is determined a list including neighboring reference receivers.

The apparatus, wherein the request message includes an identifier of a transaction between the apparatus and the first reference receiver.

The apparatus, wherein the request message includes coordinates for the second reference receiver.

The apparatus, wherein the request message includes a quality requirement such that parameters associated with the second reference receiver comply with the quality requirement.

The apparatus, wherein the first assistance data is associated with a first transaction, and the second assistance data is associated with a second transaction.

The apparatus, wherein the first assistance data and the second assistance data are associated with the same transaction.

The apparatus, wherein a modify information element is sent with the request message and a new transaction is not launched for the second assistance data.

A method, comprising:
receiving, at a server, a request message requesting second assistance data;
determining if the requested second assistance data can be supplied;
transmitting second assistance data and first assistance data if the requested second assistance data can be supplied;
receiving a request to cease transmission of the first assistance data; and
ceasing transmission of the first assistance data.

The method, wherein the first assistance data is associated with a first reference receiver and the second assistance data is associated with a second reference receiver.

The method, wherein the first and second reference receivers are virtual reference receivers.

The method, wherein the request message includes an identifier of the second reference receiver.

The method, wherein the request message includes an identifier of a transaction between a target device and the first reference receiver.

The method, wherein the request message includes coordinates of the second reference receiver.

The method, wherein the request message includes a quality requirement such that parameters associated with the second reference receiver comply with the quality requirement.

The method, wherein the first assistance data is associated with a first transaction, and the second assistance data is associated with a second transaction.

The method, wherein the first assistance data and the second assistance data are associated with the same transaction.

The method, wherein a modify information element is sent with the request message and a new transaction is not launched for the second assistance data.

A computer program product, embodied on a non-transitory computer-readable medium, comprising, computer code including computer-executable instructions that cause a processor to perform the above processes.

An apparatus, comprising:
a processor; and
a memory unit communicatively connected to the processor, and including computer code configured to, operating with the processor, cause the apparatus to:
  receive a request message requesting second assistance data;
  determine if the requested second assistance data can be supplied;
  transmit second assistance data and first assistance data if the requested second assistance data can be supplied;
  receive a request to cease transmission of the first assistance data; and
  cease transmission of the first assistance data.

The apparatus, wherein the first assistance data is associated with a first reference receiver and the second assistance data is associated with a second reference receiver.

The apparatus, wherein the first and second reference receivers are virtual reference receivers.

The apparatus, wherein the request message includes an identifier of the second reference receiver.

The apparatus, wherein the identifier of the second reference receiver is determined from a list including neighboring reference receivers.

The apparatus, wherein the request message includes an identifier of a transaction between a target and the first reference receiver.

The apparatus, wherein the request message includes coordinates of the second reference receiver.

The apparatus, wherein the request message includes a quality requirement such that parameters associated with the second reference receiver comply with the quality requirement.

The apparatus, wherein the first assistance data is associated with a first transaction, and the second assistance data is associated with a second transaction.

The apparatus, wherein the first assistance data and the second assistance data are associated with the same transaction.

The apparatus, wherein a modify information element is sent with the request message and a new transaction is not launched for the second assistance data.

What is claimed is:

1. A method, comprising:
   receiving a first provide message, from a server, comprising periodic assistance data, said first provide message comprising a transaction identifier identifying a first transaction;
   determining whether a change in periodic assistance data is to be made;
   in response to determining that the change is to be made, transmitting, from a communication device, a request message with an information element, wherein the request message is configured to request to modify the periodic assistance data without triggering a new transaction in order to get modified periodic assistance data; and the information element is configured to request the change in a set of virtual reference receivers (VRR) by requesting a transmission of reference assistance data for a first VRR and discontinuing an existing transmission of reference assistance data for a second VRR; and
   receiving a second provide message, from said server, comprising the modified periodic assistance data, said second provide message comprising the transaction identifier identifying the first transaction;
   wherein said provide messages and said request messages are linked by a periodic session identification parameter.

2. The method of claim 1, wherein the periodic assistance data comprises first assistance data associated with a first reference receiver.

3. The method of claim 2, wherein the request message is configured to request second assistance data associated with a second reference receiver, wherein the second assistance data is different than the first assistance data.

4. The method of claim 3, wherein the modified periodic assistance data comprises the first assistance data and the second assistance data.

5. The method of claim 4, wherein the periodic assistance data is further modified as a response to a further request message requesting ceasing transmission of the first assistance data.

6. The method of claim 5, wherein the further modified assistance data comprises the second assistance data.

7. The method of claim 5, further comprising receiving a third provide message comprising the modified periodic assistance data, said third provide message comprises the transaction identifier identifying the first transaction.

8. A computer program product, embodied on a non-transitory computer-readable storage medium comprising computer code configured to cause an apparatus to perform the process of:
   receiving, from a server, a first provide message comprising periodic assistance data, said first provide message comprising a transaction identifier identifying a first transaction;
   determining whether a change in periodic assistance data is to be made;
   in response to determining that the change is to be made, transmitting a request message with an information element, wherein the request message is configured to request to modify the periodic assistance data without triggering a new transaction in order to get modified periodic assistance data; and the information element is configured to request the change in a set of virtual reference receivers (VRR) by requesting a transmission of reference assistance data for a first VRR and discontinuing an existing transmission of reference assistance data for a second VRR; and
   receiving, from a server, a second provide message comprising the modified periodic assistance data, said second provide message comprising the transaction identifier identifying the first transaction;
   wherein said messages are linked by a periodic session identification parameter.

9. An apparatus, comprising:
   a processor; and
   a memory unit communicatively connected to the processor, and including computer code configured to, operating with the processor, cause the apparatus to:
   receive a first provide message, from a server, comprising periodic assistance data, said first provide message comprising a transaction identifier identifying a first transaction;
   determine whether a change in periodic assistance data is to be made;
   in response to determining that the change is to be made, transmit a request message with an information element, wherein the request message is configured to request to modify the periodic assistance data without triggering a new transaction in order to get modified periodic assistance data; and the information element is configured to request the change in a set of virtual reference receivers (VRR) by requesting a transmission of reference assistance data for a first VRR and discontinuing an existing transmission of reference assistance data for a second VRR; and
   receive a second provide message, from said server, comprising the modified periodic assistance data, said second provide message comprising the transaction identifier identifying the first transaction;
   wherein said provide messages and said request messages are linked by a periodic session identification parameter.

10. The apparatus of claim 9, wherein the periodic assistance data comprises first assistance data associated with a first reference receiver.

11. The apparatus of claim 10, wherein the request message is configured to request second assistance data associated with a second reference receiver, wherein the second assistance data is different than the first assistance data.

12. The apparatus of claim 9, wherein the apparatus is comprised in a mobile communication device.

13. A method, comprising:

transmitting, from a server, a first provide message comprising periodic assistance data, said first provide message comprising a transaction identifier identifying a first transaction;

receiving, from a communications device, a request message with an information element, and determining that the request message is configured to request to modify the periodic assistance data without triggering a new transaction in order to get modified periodic assistance data; and the information element is configured to request a change in a set of virtual reference receivers (VRR) by requesting a transmission of reference assistance data for a first VRR and discontinuing an existing transmission of reference assistance data for a second VRR; and transmitting, from said server as a response to the request message, a second provide message comprising the modified periodic assistance data, said second provide message comprises the transaction identifier identifying the first transaction;

wherein said provide messages and said request messages are linked by a periodic session identification parameter.

14. The method of claim 13, wherein the periodic assistance data comprises first assistance data associated with a first reference receiver.

15. The method of claim 14, wherein the request message is configured to request second assistance data associated with a second reference receiver, wherein the second assistance data is different than the first assistance data.

16. The method of claim 15, wherein the modified periodic assistance data comprises the first assistance data and the second assistance data.

17. The method of claim 16, wherein the periodic assistance data is further modified as a response to a further request message requesting ceasing transmission of the first assistance data.

18. The method of claim 17, wherein the further modified assistance data comprises the second assistance data.

19. The method of claim 17, further comprising transmitting a third provide message comprising the modified periodic assistance data, said third provide message comprises the transaction identifier identifying the first transaction.

20. A computer program product, embodied on a non-transitory computer-readable storage medium comprising computer code configured to cause an apparatus to perform the process of:

transmitting a first provide message comprising periodic assistance data, said first provide message comprising a transaction identifier identifying a first transaction;

receiving a request message with a modified information element, and determining that the request message is configured to request the periodic assistance data without triggering a new transaction; and the modified information element is configured to request a virtual reference receiver (VRR) change by requesting a transmission of reference assistance data for a first VRR and discontinuing an existing transmission of reference assistance data for a second VRR; and transmitting, as a response to the request message, a second provide message comprising the modified periodic assistance data, said second provide message comprising the transaction identifier identifying the first transaction;

wherein said messages are linked by a periodic session identification parameter.

21. An apparatus, comprising:

a processor; and a memory unit communicatively connected to the processor, and including computer code configured to, operating with the processor, cause the apparatus to:

transmit a first provide message comprising periodic assistance data, said first provide message comprising a transaction identifier identifying a first transaction;

receive, from a communications device, a request message with a modified information element, and determine that the request message is configured to request the periodic assistance data without triggering a new transaction; and the modified information element is configured to request a virtual reference receiver (VRR) change by requesting a transmission of reference assistance data for a first VRR and discontinuing an existing transmission of reference assistance data for a second VRR; and transmit, as a response to the request message, a second provide message comprising the modified information element and periodic assistance data, said second provide message comprising the transaction identifier identifying the first transaction;

wherein said messages are linked by a periodic session identification parameter.

22. The apparatus of claim 21, wherein the periodic assistance data comprises first assistance data associated with a first reference receiver.

23. The apparatus of claim 22, wherein the request message is configured to request second assistance data associated with a second reference receiver, wherein the second assistance data is different than the first assistance data.

24. The apparatus of claim 21, wherein the apparatus is a location server.

* * * * *